United States Patent [19]
Klages et al.

[11] Patent Number: 5,269,585
[45] Date of Patent: Dec. 14, 1993

[54] MOTOR VEHICLE BODY

[75] Inventors: Ulrich Klages, Lenting; Norbert Enning, Denkendorf; Heinrich Timm, Ingolstadt, all of Fed. Rep. of Germany

[73] Assignee: AUDI AG, Fed. Rep. of Germany

[21] Appl. No.: 773,608

[22] PCT Filed: Mar. 19, 1990

[86] PCT No.: PCT/EP90/00449
§ 371 Date: Nov. 27, 1991
§ 102(e) Date: Nov. 27, 1991

[87] PCT Pub. No.: WO90/14981
PCT Pub. Date: Dec. 13, 1990

[30] Foreign Application Priority Data

Jun. 5, 1989 [DE] Fed. Rep. of Germany ....... 3913280

[51] Int. Cl.$^5$ ................................................ B62D 25/00
[52] U.S. Cl. ........................................ 296/205; 296/201
[58] Field of Search ............... 296/205, 203, 204, 209, 296/185, 194, 195

[56] References Cited

U.S. PATENT DOCUMENTS

| | | | |
|---|---|---|---|
| 3,222,101 | 12/1965 | Belsky | 296/28 |
| 4,552,400 | 11/1985 | Harasaki et al. | 296/185 |
| 4,618,163 | 10/1986 | Hasler et al. | 280/785 |
| 4,826,238 | 5/1989 | Misono et al. | 296/205 |
| 4,883,309 | 11/1989 | Miyazaki et al. | 296/194 |
| 4,986,597 | 1/1991 | Clausen | 296/205 |

FOREIGN PATENT DOCUMENTS

| | | |
|---|---|---|
| 729545 | 12/1942 | Fed. Rep. of Germany . |
| 6902565 | 1/1969 | Fed. Rep. of Germany . |
| 8604027 | 5/1986 | Fed. Rep. of Germany . |
| 2025910 | 9/1970 | France . |
| 58-136513 | 11/1983 | Japan . |

Primary Examiner—Robert R. Song
Attorney, Agent, or Firm—Jacques M. Dulin; Thomas C. Feix

[57] ABSTRACT

A motor vehicle body assembled from a plurality of metal frame profiles held together by node connector elements. Each metal frame profile includes an extruded metal portion and a pre-shaped sheet metal portion attached thereto to form a portion of the outer skin of the completed motor vehicle body. Each pre-shaped sheet metal portion is secured to the extruded metal portion so that it overlaps a part of the outer contour of the extruded metal portion to define an enclosed hollow space. This provides a box-type construction which increases strength and rigidity of the combined frame profile.

8 Claims, 1 Drawing Sheet

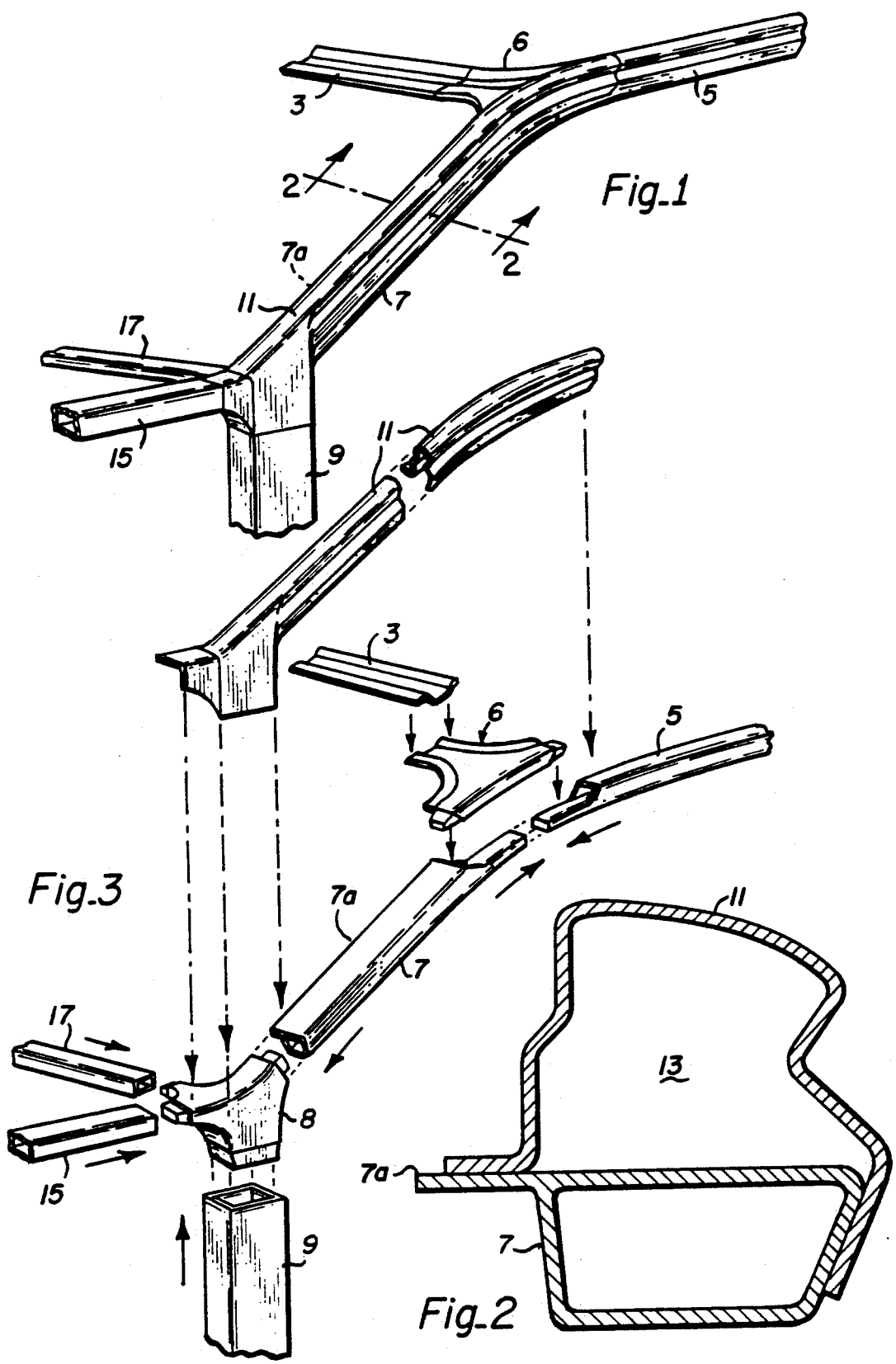

MOTOR VEHICLE BODY

CROSS REFERENCE TO RELATED APPLICATIONS

Applicants are inventors and owners of U.S. Ser. No. 07/761,786, filed Sep. 20, 1991, directed to a method and apparatus for the assembly of a motor vehicle chassis of the type using open molded nodal connectors for joining together cast or extruded metal frame pieces. The benefit of the filing date for that disclosure is claimed under 35 USC §119 and §120.

FIELD

The invention relates generally to a method and apparatus for assembly of a motor vehicle body. More particularly, the invention relates to a motor vehicle body of the type which is assembled from a plurality of individual frame pieces comprising extruded metal profiles which are joined together by node connectors and whereby pre-shaped sheet metal pieces are connected to the extruded metal profiles. The pre-shaped sheet metal pieces provide additional strength and rigidity to the extruded metal profiles and form a portion of the outer skin of the motor vehicle body.

BACKGROUND

A motor vehicle body which is assembled from a plurality of individual frame pieces, each formed through an extrusion process is known, for example, from U.S. Pat. No. 4,618,163 (Hasler et al.). In Hasler, the extruded metal profiles are held together by specially devised node connector elements. This technique for motor vehicle body construction is adequately cost-favorable for small scale production. However, in the case of large scale production, it is preferable to form the frame pieces out of sheet metal rather than by a metal extrusion process, in view of the economies of scale involved.

A disadvantage with using sheet metal as a frame piece material is the difficultly in forming frame pieces with a desired cross sectional configuration which also appropriately balances the variables of weight and rigidity. Moreover, specially constructed metal forming machines are necessary for this task, thereby adding to the expense. Accordingly, sheet metal is primarily used in the finishing process to form the outer skin of the vehicle body.

Accordingly, there is a need in the art for the design of a motor vehicle body using frame pieces constructed of a combination of both extruded metal profiles and sheet metal in a manner that optimizes the strengths of each material so that various and intricate cross sections can be economically produced.

THE INVENTION

Objects

It is a primary object of the present invention to provide an improved motor vehicle body of the type constructed of extruded metal frame profiles held together by node connector elements whereby preshaped sheet metal pieces also comprise a portion of each frame piece in a manner to form an outer skin portion of the vehicle body;

It is another object of the invention to provide such an improved motor vehicle body wherein the addition of the pre-shaped sheet metal pieces to the extruded metal profiles permits the use of relatively small cross sections for each extruded metal profile so that considerable weight savings are achieved;

It is another object of the invention to provide an improved motor vehicle body which permits a construction of intricate or different cross sections for the different frame pieces at a low cost;

It is another object of the invention to provide an improved motor vehicle body whereby the sheet metal pieces join to the extruded metal profiles in a manner to enclose a cavity between the two materials and whereby the enclosed cavity provides a box-type frame piece construction to increase the overall strength and rigidity of the motor vehicle body;

Still other objects will evident from the specification, drawings, and claims which follow.

DRAWINGS

The invention is described in more detail with reference to the drawings in which:

FIG. 1 is a fragmentary isometric view showing a portion of a motor vehicle body which encompasses the front roof column;

FIG. 2 is cross sectional view of the front roof column taken along the line and looking into the direction of Arrows 2—2 of FIG. 1; and FIG. 3 is an exploded isometric view of FIG. 1.

A motor vehicle body assembled from a plurality of frame pieces of various and intricate cross sections and which are connected together by use of node connectors. Each frame piece combines two materials of construction, including a main extruded metal section and an attached sheet metal portion which, together, form the cross sectional configuration having a sufficient strength to weight ratio and desired outer profile curve. By this new system of construction of the frame pieces, the advantages of strength and stiffness offered by an extruded metal profile are combined with sheet metal pieces which are easily pre-shaped to form a desired outer surface contour. The invention permits the construction of frame pieces having very intricate cross sections for a very low cost.

In contrast to motor vehicle bodies in which the frame pieces are fabricated completely out of sheet metal, the intricate cross sections of the extruded metal/sheet metal combination may be constructed much more easily and without major fabrication expense and investment in additional tooling for pressing or forming sheet metal into the desired shapes.

The stiffness of each frame piece is primarily ensured by the extruded metal profile. Additional strength is afforded by the box-type construction achieved through the enclosed cavity formed by the connection of the specially shaped sheet metal pieces to the extruded metal profiles. The sheet metal pieces also form part of the outer skin of the motor vehicle body. In this manner, the two elements are optimally utilized to achieve the tasks to which they are best suited.

It is preferable to use the same or similar quality of sheet metal as the other outer skin portions of the motor vehicle body. It is not a major requirement that the sheet metal pieces, by themselves, be of a stiffness or strength to support the motor vehicle body, as this is primarily ensured by the extruded metal profiles to which they are connected. It is noted that a large moment of resistance can be achieved by an extruded metal profile, having a simple and relatively small cross sectional area. Also, the simplicity of the extrusion configuration minimizes the fabrication expense for the individual frame pieces of the present invention, thereby encouraging the use of this technique in a large production scale process.

For the case where the extruded profiles are to be connected together by node elements, the specially shaped sheet metal pieces may also be used to cover a portion of or even all of these node connector elements. This is particularly advantageous when the node connector elements used are of the open molded variety, since this eliminates the need for separate node connector cover plates. The existing number of visible joints also represents a considerable cost savings, since the preparation steps for lacquering, including grinding down and filling in visible joints along the outer surface of the vehicle body, are substantially reduced.

DETAILED DESCRIPTION OF THE BEST MODE

The following detailed description illustrates the invention by way of example, not by way of limitation of the principles of the invention. This description will clearly enable one skilled in the art to make and use the invention, and describes several embodiments, adaptations, variations, alternatives and uses of the invention, including what we presently believe is the best mode of carrying out the invention.

The components depicted in the isometric view of FIG. 1 illustrate the frame elements which generally comprise the left forward passenger compartment of the motor vehicle body. The individual frame pieces are fashioned into extruded metal profiles, 3, 5, 7, 9, 15 and 17. In this example, extruded profile 3 is the lateral roof support brace, extruded profile 5 is the longitudinal roof support brace, extruded profile 7 is the roof support post, extruded profile 9 is the forward door post, extruded profile 15 is the fender support post and extruded profile 17 is a transverse girder for providing bottom support for a front windscreen. The extruded profiles 3, 5 and 7 are held together by an upper node element 6 (see FIG. 3). The extruded profiles 7 and 9 are joined by lower node elements (see in FIG. 3). The roof support post 7 also includes a flange member 7a which may support a sealing flange for the front windscreen of the automobile.

As is best seen in FIG. 3, the exploded isometric view of FIG. 1, a sheet metal piece 11 is connected to the outward facing surfaces of extruded roof support post 7 to form part of the outer surface of the motor vehicle body. An upper portion of the sheet metal piece 11 covers the upper node element 6, while a lower portion of the sheet metal piece 11 extends across the lower node element 8. In this manner, the sheet metal piece 11 forms the outer skin of the motor vehicle body in the entire region of the frame piece representing the front roof column.

The node connector elements are preferably formed as open molded pieces, such as the node element 6. Open molded node elements which connect individual frame elements along outwardly facing juncture regions permit smoother transitional areas for the inward facing surfaces of the frame boundary areas which form the sealing flanges for the windows and/or doors. For more discussion on the merits and advantages of using these unique open molded node connector elements, refer to our co-pending application for MOTOR VEHICLE CHASSIS, Ser. No. 07/761,786, filed Sep. 20, 1991, (based on international application number PCT/EP90/00450), the subject matter of which is hereby incorporated by reference to the extent needed. Alternatively, conventional node elements may be used, such as those resembling joint 8 and which include a plurality of protrusions or extensions corresponding to, or complementing, the inner contour of recesses or cutouts of the joining elements 7, 9, 15 and 17.

FIG. 2 is a cross section through the extruded metal roof support post 7 and the connected sheet metal piece 11 showing the enclosure of a cavity area 13 by the two connecting portions. This cross section also illustrates how the two materials complement each other in forming the finished frame piece. Extruded metal profile 7 provides the necessary rigidity and strength for the front roof support post while the pre-shaped sheet metal piece 11 forms part of the outer skin of the vehicle body to permit painting, lacquering, etc., prior to final assembly of the motor vehicle. The enclosed cavity 13 also provides a box-type construction which also increases the strength and stiffness of this frame piece without significantly adding to the cost of manufacture. Conventional adhesives or other known bonding methods can be used to connect the sheet metal piece 11 to the extruded profile 7 in the manner shown.

As is seen in FIG. 3 the sheet metal piece 11 is also used to cover the open node elements, thus reducing the number of joints present in the finished outer skin of the motor vehicle body, thereby substantially eliminating the number of joints which must be filled in or ground down before the lacquering of the motor vehicle body.

While the following description specifically describes the novel combination of specially shaped sheet metal pieces in combination with extruded metal frame profiles for the forward left corner region of the passenger compartment of the motor vehicle body, it is understood that the assembly techniques described herein generally apply to the construction of the entire motor vehicle body.

It should be understood that various modifications within the scope of this invention can be made by one of ordinary skill in the art without departing from the spirit thereof. We therefore wish our invention to be defined by the scope of the appended claims in view of the specification as broadly as the prior art will permit.

We claim:

1. An improved motor vehicle body of the type assembled from a plurality of frame elements comprising in operative combination:
   a) at least one frame element constructed from two different materials including:
      i) a first extruded frame profile section, said first extruded frame profile section having an inwardly facing portion and an outwardly facing portion;
      ii) a second preshaped sheet metal piece; said second sheet metal piece formed as an open shell and being generally C-shaped when viewed in cross section;
   b) said second sheet metal piece for forming at least a portion of the outer skin of said motor vehicle body and is disposed connected to said outwardly facing portion of said first extruded frame profile section to enclose a cavity area between said outwardly facing portion of said first extruded profile section and an inwardly facing portion of said second sheet metal piece; and
   c) said at least one frame element forms a portion of a window opening of said motor vehicle body.

2. An improved motor vehicle body as in claim 1 wherein:
 a) said extruded metal frame profile section is joined to at least one adjacent frame element by a connector node; and
 b) said sheet metal piece associated with said extruded metal frame profile section having end portions disposed to cover outwardly facing portions of said connector node.

3. An improved motor vehicle body frame element comprising in operative combination:
 a) an extruded, elongated frame profile section having a plurality of walls forming a hollow closed cross section; and
 b) a preshaped, elongated open shell sheet metal member matingly engageable to at least one wall of said extruded profile section to enclose a second hollow cross-section and forming a unified structure of box-type construction; and
 c) said frame element forms a portion of a window opening of said motor vehicle body.

4. An improved motor vehicle body frame element as in claim 2 wherein:
 a) said sheet metal member is longer than said extruded profile section.

5. An improved motor vehicle body frame element as in claim 3 wherein:
 a) said sheet metal member is generally C-shaped in cross-section.

6. An improved motor vehicle body of the type assembled from a plurality of frame elements comprising in operative combination:

a) at least one frame element constructed from two different materials including:
  i) a first extruded frame profile section, said first extruded frame profile section having an inwardly facing portion and an outwardly facing portion;
  ii) a second preshaped sheet metal piece, said second sheet metal piece formed as an open shell and being generally C-shaped when viewed in cross section;
 b) said second sheet metal piece for forming at least a portion of the outer skin of said motor vehicle body and is disposed connected to said outwardly facing portion of said first extruded frame profile section to enclose a cavity area between said outwardly facing portion of said first extruded profile section and an inwardly facing portion of said second sheet metal piece;
 c) said extruded metal frame profile section is joined to at least one adjacent frame element by a connector node; and
 d) said sheet metal piece associated with said extruded metal frame profile section having end portions disposed to cover outwardly facing portions of said connector node.

7. An improved motor vehicle body frame element as in claim 3 wherein:
 a) said sheet metal member forms a portion of the outer skin of the motor vehicle body.

8. An improved motor vehicle body frame element as in claim 4 wherein:
 a) said sheet metal member forms a portion of the outer skin of the motor vehicle body.

* * * * *